United States Patent
Pillai et al.

(10) Patent No.: US 11,924,217 B2
(45) Date of Patent: *Mar. 5, 2024

(54) DATA SECURITY SYSTEMS AND METHODS

(71) Applicant: State Farm Mutual Automobile Insurance Company, Bloomington, IL (US)

(72) Inventors: Vaidya Balasubramanian Pillai, Springfield, IL (US); Gregory Debo, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,338

(22) Filed: Feb. 16, 2023

(65) Prior Publication Data

US 2023/0208846 A1    Jun. 29, 2023

Related U.S. Application Data

(63) Continuation of application No. 17/074,247, filed on Oct. 19, 2020, now Pat. No. 11,588,823, which is a (Continued)

(51) Int. Cl.
| | |
|---|---|
| *H04L 9/40* | (2022.01) |
| *G06F 11/34* | (2006.01) |
| *G06F 21/60* | (2013.01) |
| *G06F 21/62* | (2013.01) |
| *H04L 67/306* | (2022.01) |

(52) U.S. Cl.
CPC ........ *H04L 63/102* (2013.01); *G06F 11/3476* (2013.01); *G06F 21/604* (2013.01); *G06F 21/6218* (2013.01); *H04L 67/306* (2013.01); *G06F 2221/2141* (2013.01)

(58) Field of Classification Search
CPC .. H04L 63/102; H04L 67/306; G06F 11/3476; G06F 21/604; G06F 21/6218; G06F 2221/2141
See application file for complete search history.

(56) References Cited

U.S. PATENT DOCUMENTS

| | | | |
|---|---|---|---|
| 6,539,382 | B1 | 3/2003 | Byrne |
| 7,149,862 | B2 | 12/2006 | Tune |

(Continued)

*Primary Examiner* — Huan V Doan
(74) *Attorney, Agent, or Firm* — Armstrong Teasdale LLP

(57) ABSTRACT

A system for data security includes a processor and a computer-readable storage medium having instructions stored thereon that cause the processor to perform operations including: (i) logging data access events initiated by a user; (ii) generating a user profile of the user, the user profile including a size and a type of data accessed by each data access event; (iii) receiving a new data access event initiated by the user including a size and a type of data requested by the new data access event; (iv) comparing the size and the type of the requested data of the new data access event to the user profile; (v) determining that the new data access event initiated by the user does not correspond to the data included in the user profile; (vi) restricting the requested data associated with the new data access event; and (vii) transmitting the restricted data to the user.

20 Claims, 4 Drawing Sheets

Related U.S. Application Data continuation of application No. 15/995,570, filed on Jun. 1, 2018, now Pat. No. 10,834,087.

(60) Provisional application No. 62/513,540, filed on Jun. 1, 2017.

(56) References Cited

U.S. PATENT DOCUMENTS

| | | |
|---|---|---|
| 7,484,245 B1 | 1/2009 | Friedman |
| 7,568,235 B2 | 7/2009 | Bird |
| 7,783,666 B1 | 8/2010 | Zhuge |
| 8,443,443 B2 | 5/2013 | Nordstrom |
| 8,566,956 B2 | 10/2013 | Slater |
| 9,185,095 B1 | 11/2015 | Moritz |
| 2008/0046666 A1 | 2/2008 | Termaine |
| 2009/0222329 A1 | 9/2009 | Ramer |
| 2010/0274691 A1* | 10/2010 | Hammad ............ G06Q 20/3221 705/30 |
| 2011/0087547 A1 | 4/2011 | Amaro |
| 2011/0321175 A1* | 12/2011 | Slater .................... G06F 21/552 726/28 |
| 2012/0089996 A1 | 4/2012 | Ramer |
| 2014/0222533 A1 | 8/2014 | Ovick |
| 2015/0310188 A1 | 10/2015 | Ford |
| 2017/0180416 A1 | 6/2017 | Giura |

* cited by examiner

DATA SECURITY SYSTEMS AND METHODS

CROSS REFERENCE TO RELATED APPLICATIONS

This application is a continuation of, and claims the benefit of priority to, U.S. patent application Ser. No. 17/074,247, entitled "DATA SECURITY SYSTEMS AND METHODS," which was filed on Oct. 19, 2020, which is a continuation of U.S. patent application Ser. No. 15/995,570, entitled "DATA SECURITY SYSTEMS AND METHODS," which was filed on Jun. 1, 2018, which claims the benefit of U.S. Patent Application No. 62/513,540, entitled "DATA SECURITY SYSTEMS AND METHODS," which was filed Jun. 1, 2017, all of which are hereby incorporated by reference in their entirety.

FIELD OF THE DISCLOSURE

The present disclosure relates to systems and methods for providing data security and, more particularly, to network-based systems and methods for securing electronic data stored within memory.

BACKGROUND

At least some known data security systems may be configured for the purpose of monitoring data access events by one or more data users. For example, it may be desirable in many instances to monitor and track data access events, such as data read and write events, initiated by one or more data users. To accomplish this task, many conventional monitoring systems may compare a user's data access rights to data access events initiated by the user. In addition, such systems may restrict the data to which a user is granted access based upon the user's data access rights. Thus, where a user initiates a data access event (e.g., trying to retrieve data) that is beyond the scope of the user's data access rights, the monitoring system may refuse the attempted access event.

For instance a company may grant data access rights to a number of its employees, such as, for example, a number of salespeople. All of these salespeople may be granted access to a subset of the data maintained by the company, such as, for example, one million rows of data maintained within a database table. However, one of the salespersons may only regularly access data from the first one-hundred rows of the table for a period of time, such as over the course of a year. At some later point in time, that one salesperson may attempt to access all one million rows of data originally allocated to the salesperson. The known conventional data security systems will grant the salesperson access to the expanded data set, because the salesperson was originally granted access to all one million rows. In other words, these known conventional data security systems would ignore the salesperson's historical data access patterns and may, as a result, fail to flag or otherwise capture data access events initiated by the salesperson that are beyond the scope of the salesperson's historical data access patterns.

Thus, these known conventional data security systems may not track data access patterns and data access trends on a user-by-user basis, and these systems may, as a result, grant access to data based upon access events that fall within the scope of a particular user's access permissions, but which are nonetheless outside the scope of one or more data access events historically performed by the user.

BRIEF SUMMARY

The present embodiments may relate to systems and methods for data security. In one aspect, a system for data security is provided. In some exemplary embodiments, the system includes a processor and a non-transitory, tangible, computer-readable storage medium having instructions stored thereon that, in response to execution by the processor, cause the processor to perform operations including: (i) logging a plurality of data access events initiated by a user, such as, for example, logging requests initiated by users for access to data maintained within a database; (ii) analyzing the plurality of data access events; (iii) generating, based upon the analyzing, a user profile, the user profile including at least one historical data access pattern associated with the user; (iv) comparing a data access event initiated by the user to the user profile; and (v) determining, based upon to the comparing, whether the data access event initiated by the user corresponds to the at least one historical data access pattern included in the user profile. For example, the processor may log a plurality of requests submitted by a particular user for access to particular data, and, based upon the plurality of requests, the processor may construct a user profile that reflects the user's requests for data over a historical period of time. This user profile may thus represent or identify data that the user typically, normally, and/or historically requests.

In another aspect, the processor may be further configured to perform operations including performing, in response to the determining, at least one action, wherein the at least one action includes at least one of: generating a notification, generating an alert, permitting the data access event initiated by the user, denying the data access event initiated by the user, and restricting data returned to the user in response to the data access event. The processor may be further configured to perform operations including storing the plurality of data access events initiated by the user in a first database. In addition, in some embodiments, the processor may be further configured to perform operations including storing the user profile in a second database.

In another aspect, the processor may be further configured to perform operations including: (i) logging a plurality of data access events initiated by a plurality of users; (ii) analyzing the plurality of data access events in association with each of the plurality of users; (iii) generating, based upon the analyzing, a plurality of user profiles, each user profile of the plurality of user profiles including at least one historical data access pattern; (iv) comparing a plurality of data access events initiated by the plurality of users to the plurality of user profiles; and (v) determining, based upon to the comparing, whether each of the plurality of data access events initiated by each of the plurality of users corresponds to a particular historical data access pattern included in a user profile of the plurality of user profiles.

In another aspect, the processor may be further configured to perform operations including performing, in response to the determining, at least one action, wherein the at least one action includes at least one of: generating a notification, generating an alert, permitting the data access event initiated by the user, denying the data access event initiated by the user, and restricting data returned to the user in response to the data access event. In addition, the processor may be further configured to perform operations including generating, based upon the comparing, at least one report, the at least one report including at least one of: the at least one data access pattern associated with the user, at least one data access right associated with the user, and a number of data records affected by the data access event initiated by the user. The system may have additional, less, or alternate functionality, including that discussed elsewhere herein.

In another aspect, at least one non-transitory computer readable storage media having computer-executable instructions embodied thereon, wherein when executed by at least one processor, the computer-executable instructions cause the processor to: (i) log a plurality of data access events initiated by a user; (ii) analyze the plurality of data access events; (iii) generate, based upon the analyzing, a user profile, the user profile including at least one historical data access pattern associated with the user; (iv) compare a data access event initiated by the user to the user profile; and (v) determine, based upon to the comparing, whether the data access event initiated by the user corresponds to the at least one historical data access pattern included in the user profile.

In another aspect, the computer-executable instructions may further cause the processor to at least one of: generate a notification, generate an alert, permit the data access event initiated by the user, deny the data access event initiated by the user, and restrict data returned to the user in response to the data access event. The computer-executable instructions may further cause the processor to store the plurality of data access events initiated by the user in a first database and/or store the user profile in a second database.

In another aspect, the computer-executable instructions may further cause the processor to: (i) log a plurality of data access events initiated by a plurality of users; (ii) analyze the plurality of data access events in association with each of the plurality of users; (iii) generate, based upon the analyzing, a plurality of user profiles, each user profile of the plurality of user profiles including at least one historical data access pattern; (iv) compare a plurality of data access events initiated by the plurality of users to the plurality of user profiles; and (v) determine, based upon to the comparing, whether each of the plurality of data access events initiated by each of the plurality of users corresponds to a particular historical data access pattern included in a user profile of the plurality of user profiles.

In another aspect, the computer-executable instructions may further cause the processor to at least one of: generate a notification, generate an alert, permit the data access event initiated by the user, deny the data access event initiated by the user, and restrict data returned to the user in response to the data access event. In addition, the computer-executable instructions may further cause the processor to generate, based upon the comparing, at least one report, the at least one report including at least one of: the at least one data access pattern associated with the user, at least one data access right associated with the user, and a number of data records affected by the data access event initiated by the user. The article may have additional, less, or alternate functionality, including that discussed elsewhere herein.

In yet another aspect, a method for data security is provided. The method includes (i) logging, by a processor, a plurality of data access events initiated by a user; (ii) analyzing, by the processor, the plurality of data access events; (iii) generating, by the processor and based upon the analyzing, a user profile, the user profile including at least one historical data access pattern associated with the user; (iv) comparing, by the processor, a data access event initiated by the user to the user profile; and (v) determining, by the processor and based upon to the comparing, whether the data access event initiated by the user corresponds to the at least one historical data access pattern included in the user profile.

In another aspect method also includes performing, by the processor and in response to the determining, at least one action, wherein the at least one action includes at least one of: generating, by the processor, a notification, generating an alert, permitting, by the processor, the data access event initiated by the user, denying, by the processor, the data access event initiated by the user, and restricting, by the processor, data returned to the user in response to the data access event. The method may also include storing, by the processor, the plurality of data access events initiated by the user in a first database and/or storing, by the processor, the user profile in a second database.

In another aspect, the method may include: (i) logging, by the processor, a plurality of data access events initiated by a plurality of users; (ii) analyzing, by the processor, the plurality of data access events in association with each of the plurality of users; (iii) generating, by the processor and based upon the analyzing, a plurality of user profiles, each user profile of the plurality of user profiles including at least one historical data access pattern; (iv) comparing, by the processor, a plurality of data access events initiated by the plurality of users to the plurality of user profiles; and (v) determining, by the processor and based upon to the comparing, whether each of the plurality of data access events initiated by each of the plurality of users corresponds to a particular historical data access pattern included in a user profile of the plurality of user profiles.

Further still, in some exemplary embodiments, the method may include generating, by the processor and based upon the comparing, at least one report, the at least one report including at least one of: the at least one data access pattern associated with the user, at least one data access right associated with the user, and a number of data records affected by the data access event initiated by the user. The method may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
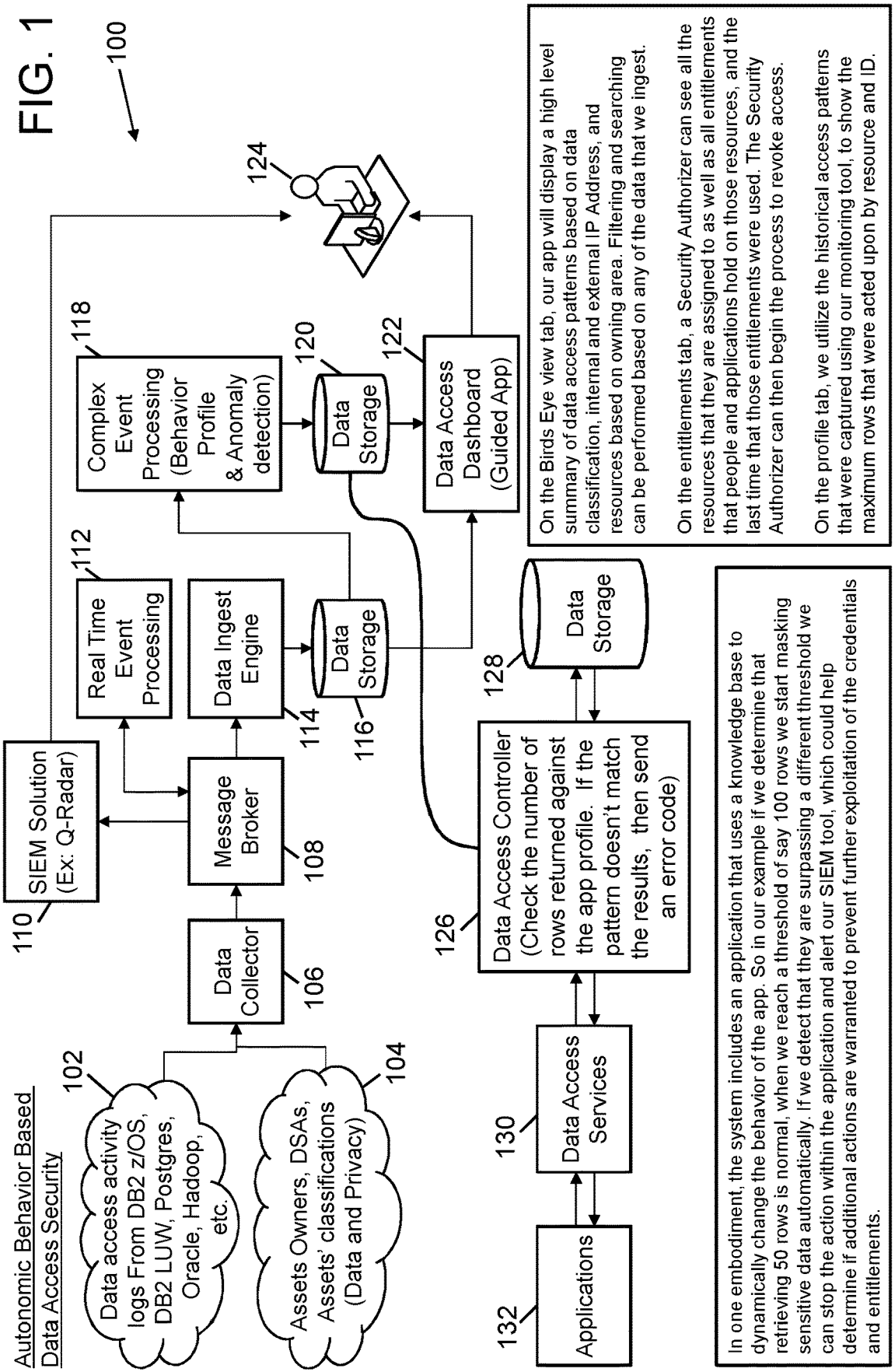
FIG. 1 illustrates a schematic diagram of an exemplary computer system for data security.

The Figures depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION OF THE DRAWINGS

The present embodiments may relate to, inter alia, systems and methods for data security. In one exemplary embodiment, the process may be performed by at least one front-end system, such as a client computer device, and at least one back-end system, such as a database server.

Accordingly, the system may generate one or more user profiles and analyze, in conjunction with the one or more user profiles, a plurality of data access events. The plurality of data access events may be analyzed to determine, for example, whether a user initiating the data access event should be granted access to data requested in conjunction with the data access event, whether one or more notifications, alarms, error codes, and/or messages should be generated in response to the data access event, and the like.

To accomplish these, and other, tasks, the system may log a plurality of data access events initiated by a user. More particularly, as described herein, the system may receive one or more data access events associated with a plurality of users and may, based upon a received plurality of data access events, generate a plurality of user profiles associated with each of the plurality of users. Based upon the analysis, the system may, in one embodiment, generate a user profile for each user. Each user profile may be constructed over a period of time and may be based upon a user's historical record of data access events. Thus, a user profile may identify a pattern of data access events, such as data access events frequently initiated by a user, data access events infrequently initiated by a user, data access events that are never initiated by a user, and the like.

Further, as described above, a score (e.g., a score ranging from one to ten, one to twenty, one to fifty, one to one hundred, and the like) may be associated with one or more data access events, where a score of one may indicate that the user has only infrequently (or never) initiated particular data access event, while a score of ten may indicate that the user commonly initiates the particular data access event. Scores between the high and low values of one and ten may be used, in similar fashion, to indicate a frequency with which the user initiates a particular data access event. Each score represents the deviation from the mean for that particular data access event. In some embodiments, the mean is determined based on the historical actions of the individual user. In other embodiments, the mean is determined based on the historical actions of a plurality of users.

The system may, in addition, receive permissions and/or access rights data associated with a plurality of users. Thus, a user profile may also indicate, for example, data access event permissions associated with a plurality of users.

In addition, and as described above, the system may analyze one or more data access events to determine whether a particular data access event corresponds to at least one historical data access pattern included in a user profile. More particularly, and in at least one exemplary embodiment, the system may compare one or more data access events initiated by a user to a user profile associated with the user to determine whether the one or more data access events initiated by the user conform to, or are otherwise in compliance with, one or more data access events historically initiated by or associated with the user. In this sense, the system may be regarded as an autonomic, behavior based, system for data access security.

The system may, in addition, perform a variety of actions based upon the analysis of one or more data access events initiated by a user. For example, the system may generate various notifications, alerts, error codes, warnings, and the like. In some cases, the alerts or notifications may be sent to a requestor, a manager, or other data security personnel for review and/or analysis. The system may also permit, deny, restrict, and/or mask data results provided in response to a particular data access event.

For instance, where a user initiates a data access event that is beyond the scope (e.g., different from a historical pattern of data access events initiated by the user) of data access events associated with a user profile of the user, the system may automatically deny the data access event and/or restrict or mask (e.g., anonymize and/or de-identify) data returned to the user in response to the data access event. For example, the system may return a subset of the data requested by a user as part of a data access event, as opposed, for example, to returning all requested data. The system is therefore intelligent enough to provide reduced or limited data sets to a user in response to a request for data made by a user that is outside the scope of the user's user profile and/or historical data access patterns. Thus, the data requested by a user in conjunction with a data access event may be masked or restricted, such that only a subset of the requested data is provided to the user. On the other hand, where a user initiates a data access event that is within the scope of data access events associated with a user profile of the user, the system may grant access to data returned in response to the data access event.

Thus, in general terms, the system may compare a data access event, such as a request for data, initiated by a user to a user profile associated with the user (e.g., one or more historical data access events associated with the user) to determine whether the user should be granted access to the data requested in conjunction with the data access event.

Exemplary technical effects of the systems, methods, and articles of manufacture described herein may include, for example: (a) data security; (b) increased system efficiency arising as a result of restricted, masked, and/or limited data results returned in response to data access events that request data outside the scope of a user's user profile and/or historical data access patterns; (c) increased system reliability arising as a result of the ability of the system to return some data even when a data access event is associated with a request for data that is beyond the scope of a particular user profile; (d) improved system bandwidth; (e) identification of data access events, such as requests for data, that are beyond the scope of one or more user profiles and/or historical data access patterns and identification of users associated with such events; and (f) autonomic and/or artificially intelligent (self-governing and/or self-learning) system features, such as construction, over time, of a user profile based upon data access events initiated by a user over a period of time.

Exemplary System for Data Security

As used herein, a "data access event" may relate to any type of data access, such as a request for data, initiated by, or in response to an action taken by, a user. For example, data access events may include, but are not limited to database queries, application access attempts, file access attempts, read attempts, read access requested events, read access granted events, read access denied events, write attempts, write access request events, write access granted events, write access denied events, requests for data, websites visited by a user, websites requested by a user, websites requested by a user in which access to the website is denied, requests made by a user for data related to a particular customer, and the like. As described herein, a data access event, such as a request for data, may be submitted to a database and/or a database server in communication with a database and/or placed in a queue of requests for data and run against the data stored within the database to obtain one or more data results.

FIG. 1 depicts a view of an exemplary system 100 for data security, such as, for example, for monitoring and responding to one or more data access events. In one exemplary embodiment, system 100 may include an activity log system 102, an assets system 104, a data collector system 106, a message broker system 108, a security and event management ("SIEM") system 110, a real time event processing system 112, a data ingest engine 114, a first database 116, a complex event processing system 118, a second database 120, a data access dashboard system 122, a client computer device 124, a data access controller 126, a third database 128, a data access services system 130, and/or one or more applications systems 132.

Although the components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. Further, although certain functions, processes, and operations are described herein with respect to one or more system components, it is contemplated that one or more other system components may perform the functions, processes, and operations described herein.

Activity log system 102 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In one or more exemplary embodiments, activity log system 102 may be communicatively coupled to one or more client computer devices (not shown) and may be configured to receive, collect, store, and/or analyze data access events associated with one or more users of the one or more client computer devices. For example, the one or more users may initiate one or more data access events (as described above) and these data access events may be monitored, tracked, and/or stored in association with the user initiating each data access event.

Similarly, assets system 104 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, assets system 104 may be communicatively coupled to one or more client computer devices (not shown) and may be configured to receive, collect, store, and/or analyze data associated with one or more assets, such as data associated with one or more computer systems, data associated with one or more customers, data associated with one or more contracts, data associated with one or more employees of a company, and the like. Assets represent applications, records, databases, and/or computer systems where access to the asset is controlled by rules and/or privileges.

Data collector system 106 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, data collector system 106 may be communicatively coupled to one or more network computing systems and/or one or more cloud computing systems, such as, for example, activity log system 102 and/or an assets system 104. As a result, data collector system 106 may receive, collect, store, and/or analyze data from one or both of activity log system 102 and/or assets system 104. For example, data collector system 106 may receive, collect, store, and/or analyze the data access events that are monitored, tracked, stored, and/or analyzed by activity log system 102. In addition, data collector system 106 may receive, collect, store and/or analyze the data associated with one or more assets collected, stored, and/or analyzed by assets system 104.

Message broker system 108 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, message broker system 108 may be communicatively coupled to data collector system 106 and may receive, collect, store, and/or analyze data from data collector system 106. For example, message broker system 108 may receive, collect, and/or store the data access events that are received collected, and/or stored by data collector system 106. In addition, message broker system 108 may receive, collect, and/or store the data associated with one or more assets received, collected, and/or stored by data collector system 106.

SIEM system 110 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In one exemplary embodiment, SIEM system 110 may be communicatively coupled to message broker system 108 and may receive, collect, store, and/or analyze data from message broker system 108. For example, SIEM system 110 may analyze data received from message broker system 108 to provide real-time (or pseudo real time) analysis of one or more security alerts generated by network hardware, network applications, and the like.

Real time event processing system 112 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, real time event processing system 112 may be communicatively coupled to message broker system 108 and may receive, collect, store, and/or analyze data from message broker system 108. For example, real time event processing system 112 may analyze data (e.g., one or more data access events) received from message broker system 108 to determine whether a particular data access event corresponds to at least one historical data access pattern included in a user profile (as described below). More particularly, and in at least one exemplary embodiment, real time event processing system 112 may compare one or more data access events initiated by a user to a user profile associated with the user to determine whether the one or more data access events initiated by the user conform to, or are otherwise in compliance with, one or more data access events historically initiated by or associated with the user.

Real time event processing system 112 may also score one or more data access events initiated by a user based upon the user profile associated with the user. For example, real time event processing system 112 may assign a score, such as a score ranging from one to ten, to a particular data access event initiated by the user. A score of one may indicate, for the example, that the user has only infrequently (or never) initiated particular data access event, while a score of ten may indicate that the user commonly initiates the particular data access event. Scores between the high and low values of one and ten may be used, in similar fashion, to indicate a frequency with which the user initiates a particular data access event. Each score may represent the deviation from the mean for that particular data access event. In some embodiments, the mean is determined based on the historical actions of the individual user. In other embodiments, the mean is determined based on the historical actions of a plurality of users.

Real time event processing system 112 may, in addition, perform a variety of actions based upon its analysis of one or more data access events initiated by a user. For example, real time event processing system 112 may generate various notifications, alerts, error codes, warnings, and the like. Real time event processing system 112 may also permit, deny, or restrict a particular data access event. For instance, where a user initiates a data access event that is beyond the scope of data access events associated with a user profile associated with the user, real time event processing system 112 may deny the data access event and/or restrict or mask data returned to the user in response to the data access event. On the other hand, where a user initiates a data access event that is within the scope of data access events associated with a user profile associated with the user, real time event processing system 112 may grant access to data returned in response to the data access event. In this sense, system 100 may be regarded as an autonomic, behavior based, system for data access security.

Thus, in general terms, real time event processing system 112 may compare a data access event, such as a request for data, initiated by a user to a user profile associated with the user (e.g., one or more historical data access events or data access patterns associated with the user) to determine whether the user should be granted access to the data requested in conjunction with the data access event.

Data ingest engine 114 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. In one exemplary embodiment, data ingest engine 114 may be communicatively coupled to message broker system 108 and may receive, collect, store, and/or analyze data from data collector system 106.

First database 116 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. First database 116 may include one or more data structures and may be organized in any suitable manner, such as, for example, as a relational database structure. First database 116 may also include and/or be communicatively coupled to one or more database servers (as described herein).

In addition, first database 116 may be communicatively coupled to data ingest engine 114 and may receive, collect, store, and/or analyze data from data ingest engine 114, such as, for example, one or more data access events. More particularly, first database 116 may store one or more data access events in association with one or more users. For example, first database 116 may associate a primary key with each user, and each data access event initiated by a user may be stored as a record in one or more data tables in association with the primary key, such that each user is uniquely associated with the data access events initiated by the user.

Complex event processing system 118 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, complex event processing system 118 may be communicatively coupled to first database 116 and may receive, collect, store, and/or analyze data from first database 116. For example, complex event processing system 118 may receive one or more data access events associated with a plurality of users and may, based upon a received plurality of data access events, generate a plurality of user profiles associated with each of the plurality of users. More particularly, complex event processing system 118 may receive and analyze a plurality of data access events associated with a plurality of users to construct a user profile for each user. Each user profile may be constructed over a period of time and may be based upon a user's historical record of data access events. Thus, a user profile may identify one or more patterns of data access events initiated by a user, such as data access events frequently initiated by a user, data access events infrequently initiated by the user, data access events that are never initiated by the user, and the like.

Further, as described above, a score (e.g., a score ranging from one to ten) may be associated with one or more data access events, where a score of one may indicate that the user has only infrequently (or never) initiated particular data access event, while a score often may indicate that the user commonly initiates the particular data access event. Scores between the high and low values of one and ten may be used, in similar fashion, to indicate a frequency with which the user initiates a particular data access event.

Complex event processing system 118 may, in addition, receive permissions and/or access rights data associated with a plurality of users. This data may be maintained, as described above, by assets system 104 and may be transmitted via system 100, to complex event processing system 118, which may include the permissions and/or access rights data with one or more user profiles as appropriate. Thus, a user profile may also indicate, for example, data access event permissions associated with a plurality of users.

In some embodiments, the operations described with respect to complex event processing system 118 and real time event processing system 112 may be consolidated and performed by a single processing system.

Second database 120 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. Second database 120 may include one or more data structures and may be organized in any suitable manner, such as, for example, as a relational database structure. Second database 120 may also include and/or be communicatively coupled to one or more database servers (as described herein).

In addition, second database 120 may be communicatively coupled to complex event processing system 118 and may receive, collect, store, and/or analyze data from complex event processing system 118, such as, for example, one or more user profiles generated by complex event processing system 118. More particularly, second database 120 may store one or more user profiles in association with one or more users. For example, second database 120 may associate a primary key with each user, and each user profile may be stored as a record in one or more data tables in association with the primary key, such that each user is uniquely associated with a particular user profile.

Data access dashboard system 122 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, data access dashboard system 122 may be communicatively coupled to one or both of first database 116 and/or second database 120 and may receive, collect, store, and/or analyze data from first database 116 and/or second database 120. For example, data access dashboard system 122 may receive data access events associated with one or more users from first database 116 and/or one or more user profiles associated with one or more users from second database 120.

Client computer device 124 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. For example, client computer device may, as described herein, be a personal computer device, a tablet computer device, a smartphone computer device, and the like.

In addition, client computer device 124 may be communicatively coupled to one or both SIEM system 110 and/or data access dashboard system 122 and may receive, collect, store, and/or analyze data from SIEM system 110 and/or data access dashboard system 122. For example, client computer device 124 may receive one or more data access events initiated by one or more users and one or more user profiles associated with one or more users and may, in turn, analyze the one or more data access events in conjunction with one or more user profiles to generate a report for display on client computer device 124 that provides information based upon the analysis, such as, for example, a report showing which users have attempted data access events that are beyond the scope of the user profiles.

Client computer device 124 may, more particularly, display a report that includes a plurality of tabs. For instance, in one embodiment, the report displayed by client computer device 124 may include a "bird's eye view" tab, an "entitlements" tab, and/or a "profile" tab. The report displayed by client computer device 124 may be useful for and generated for access by a system administrator. Entitlements represent privileges that are granted to users or privileges that are granted to entities. Entitlements are stored in a centralized entitlements data store, such as first database 116 and second database 120.

In one exemplary embodiment, the bird's eye view tab may include information, such as, for example, a high level summary of data access patterns associated with one or more users based upon one or more data classifications, one or more internal and/or external IP addresses, and/or one or more resources allocated to and/or utilized by one or more users or user groups. The bird's eye view tab may include various filtering and/or searching functions, such as, for example, functions which may be performed based upon any of the data received, collected, stored, and/or analyzed as described herein.

In addition, and in one exemplary embodiment, the entitlements tab may illustrate one or more resources, such as one or more computing systems, associated with a particular system administrator, such as a system administrator viewing the entitlements tab via client computer device 124. The entitlements tab may also illustrate one or more users and/or system applications (e.g., software applications executed by system 100) that have accessed one or more resources associated with the system administrator, including, for example, a number of times that the one or more resources were accessed, a timestamp associated with one or more access attempts, and the like. The system administrator may, in addition, utilize the entitlements table to grant, curtail, expand, and/or revoke access to one or more resources for one or more users. The system administrator may also trigger an audit of one or more users based on review. In some further embodiments, the system 100 automatically triggers an audit of a user and informs the system administrator. In still further embodiments, the system 100 revokes one or more permissions of a user in response to the triggering of an audit.

Further, in one exemplary embodiment, the profile table may illustrate historical data access event patterns associated with one or more users. Historical data access patterns may be included, as described above, in a user profile associated with each user, and a system administrator viewing the profile tab may be allowed to view a variety of profile and activity data, such as, for example, a maximum number of data records, or rows, acted upon or with respect to which a data access event has been initiated. In further embodiments, the profile and activity data may include information on the type of data records access, such as, but not limited to, the geographic region associated with the records and the dates of the records accessed.

Data access controller 126 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, data access controller 126 may be communicatively coupled to second database 120 and may receive, collect, store, and/or analyze data from second database 120. For example, data access controller 126 may analyze data (e.g., one or more data access events) to determine whether a particular data access event corresponds to at least one historical data access pattern included in a user profile (as described above). More particularly, and in at least one exemplary embodiment, data access controller 126 may compare one or more data access events initiated by a user to a user profile associated with the user to determine whether the one or more data access events initiated by the user conform to, or are otherwise in compliance with, one or more data access events historically initiated by or associated with the user.

Data access controller 126 may also score one or more data access events initiated by a user based upon the user profile associated with the user. For example, data access controller 126 may assign a score, such as a score ranging from one to ten, to a particular data access event initiated by the user. A score of one may indicate, for the example, that the user has only infrequently (or never) initiated particular data access event, while a score often may indicate that the user commonly initiates the particular data access event. Scores between the high and low values of one and ten may be used, in similar fashion, to indicate a frequency with which the user initiates a particular data access event. In some embodiments, each score represents the deviation from the mean for that particular data access event. In some embodiments, the mean is determined based on the historical actions of the individual user. In other embodiments, the mean is determined based on the historical actions of a plurality of users.

Data access controller 126 may, in addition, perform a variety of actions based upon its analysis of one or more data access events initiated by a user. For example, data access controller 126 may generate various notifications, alerts, error codes, warnings, and the like. Data access controller 126 may also permit, deny, restrict, and/or mask a particular data access event. For instance, where a user initiates a data access event that is beyond the scope of data access events associated with a user profile associated with the user, data access controller 126 may deny the data access event and/or restrict or mask data returned to the user in response to the data access event. On the other hand, where a user initiates a data access event that is within the scope of data access events associated with a user profile associated with the user, data access controller 126 may grant access to data returned in response to the data access event.

Thus, in general terms, data access controller 126 may compare a data access event, such as a request for data, initiated by a user to a user profile associated with the user (e.g., one or more historical data access events associated with the user) to determine whether the user should be granted access to the data requested in conjunction with the data access event.

Third database 128 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. Third database 128 may include one or more data structures and may be organized in any suitable manner, such as, for example, as a relational database structure. Third database 128 may also include and/or be communicatively coupled to one or more database servers (as described herein).

In addition, third database 128 may be communicatively coupled to data access controller 126 and may receive, collect, store, and/or analyze data from data access controller 126, such as, for example, one or more user profiles and/or one or more data access events. More particularly, third database 128 may store one or more user profiles and/or one or more data access events in association with one or more users. For example, third database 128 may associate a primary key with each user, and each user profile and/or data access event may be stored as a record in one or more data tables in association with the primary key, such that each user is uniquely associated with a particular user profile and/or data access event.

Data access services system 130 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein. In addition, data access services system 130 may be communicatively coupled to data access controller 126 and may receive, collect, store, and/or analyze data from data access controller 126.

Applications system 132 may include one or more processors and/or one or more tangible, non-transitory, computer-readable, storage media, such as one or more tangible, non-transitory, computer-readable, memories. The one or more processors may be communicatively coupled to the one or more memories and configured to execute computer-readable instructions stored on the one or more memories to perform operations as described herein.

In addition, applications system 132 may be communicatively coupled to data access services system 130 and may receive, collect, store, and/or analyze data from data access services system 130. For example, applications system 132 may be communicatively coupled to, or may include, a user client computing device, from which a user may interact with system 100, and from which a user may initiate one or more data access events. Thus, as a user interfaces with system 100, data access controller 126 may control access by the user to data contained within system 100, as described above, based upon a user profile associated with the user, the particular data access event initiated by the user, the user's network and file access permissions, and the like.

In some embodiments, one of first database 116, second database 120, and third database 128 stores asset metadata. Asset metadata includes classification data about the individual assets, such as whether or not the corresponding asset includes non-public personal information (NPI), sensitive personal information (SPI), personally identifiable information (PII), protected health information (PHI), and payment card information (PCI). In some further embodiments, asset metadata also includes a privacy classification for the asset, such as, but not limited to, classified, secret, and publically available. In these embodiments, the real time event processing system 112 may score the user's actions based on the user's accessing data associated with different asset metadata. In some embodiments, each user profile includes one or more asset metadata types that the user has access to.

In some embodiments, accounts for access to assets may be associated with users and with groups. Having a user as a member of a specific group may allow the user access to certain assets associated with that group. Users and/or groups may also be assigned certain roles, such as administrator or sales person. These roles may limit or expand the access that the user has. Furthermore, the real time event processing system 112 may score the user's actions based on the historical actions of other members of the group or role. For example, the real time event processing system 112 may determine that a member of the human resources group would not normally be accessing sales data, and vice versa.

In some further embodiments, the system 100 includes one or more policies that govern the access of data from assets. These policies determine which roles, groups, and/or individuals should have access to which asset, how often, how much of the asset to access at a time. These policies may also govern other aspects of the system 100, such as when an audit is triggered and when a revocation of permissions is triggered.

In some embodiments, one or more policies include what should be done if an asset is not accessed by a user for a specific period of time. The actions may include, but are not limited to, triggering an access review and revocation of the permission. In the access review, the policy governs how many days should the user be given to respond, what should occur if the user doesn't respond, and how many times should the user be reminded. If one or more permissions are to be revoked, the policies may govern when, such as immediate or after n days. The policies may also govern whether or not the user is given advance notice of the revocation of permissions.

In further embodiments, the policies may govern how to proceed if a user decides to leave the company. If the user has given notice, which permissions are revoked immediately? The policies may also instruct that the leaving user may not be allowed to access any asset that they have not accessed within a certain period of time.

In still further embodiments, the policies may govern what happens if a user moves to a different unit, team, or office. In these embodiments, the move may trigger an access review to allow a system administrator to adjust the user's permissions. In other embodiments, the system 100 may automatically update the user's permissions based on the move.

Exemplary Client Computer Device

Figure 2:
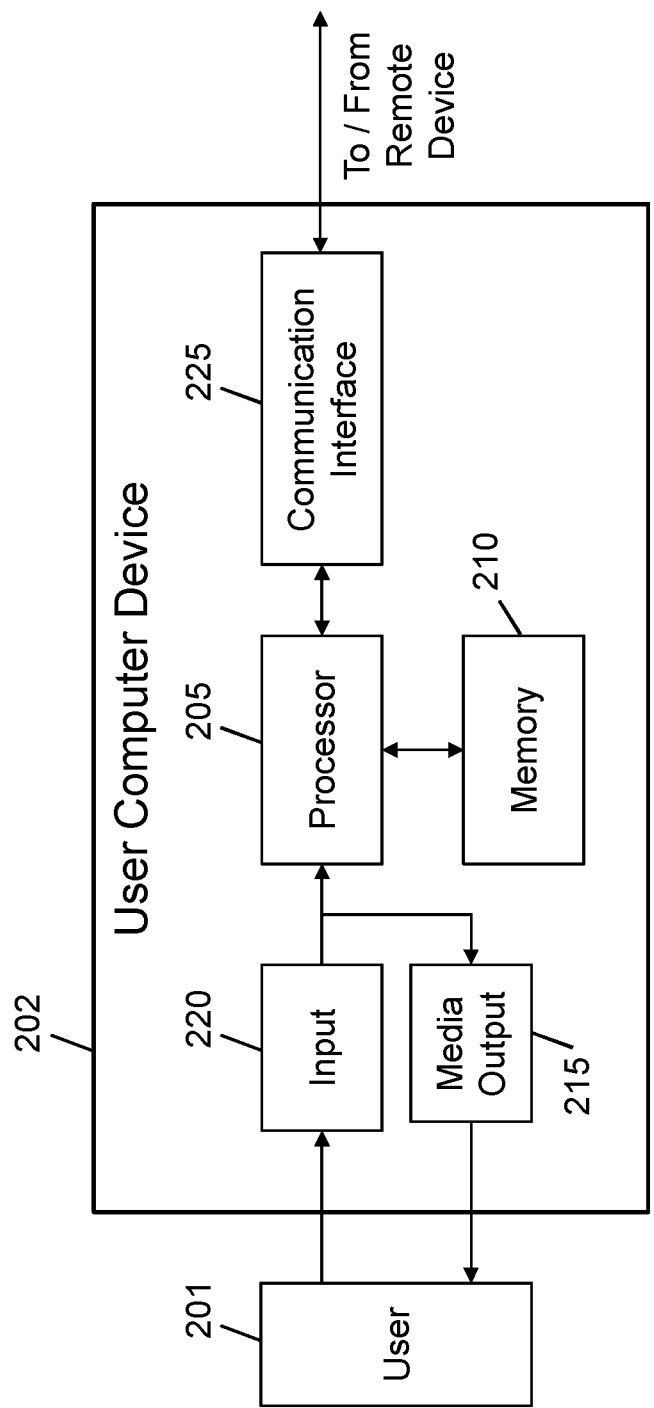
FIG. 2 illustrates an exemplary configuration of a client computer device shown in FIG. 1, in accordance with one embodiment of the present disclosure.

FIG. 2 depicts an exemplary configuration of a client computer device 202, such as client computer device 124 and/or one applications system 132, as shown in FIG. 1, and in accordance with one embodiment of the present disclosure. Client computer device 202 may be operated by a user 201. Client computer device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client computer device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client computer device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client computer device 202 may also include a communication interface 225, communicatively coupled to a remote device such as SIEM system 110, data access dashboard system 122, and/or data access services system 130 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website. A client application may allow user 201 to interact with, for example, SIEM system 110, data access dashboard system 122, and/or data access services system 130. For example, instructions may be stored by a cloud service, and the output of the execution of the instructions sent to the media output component 215.

Exemplary Database System

Figure 3:
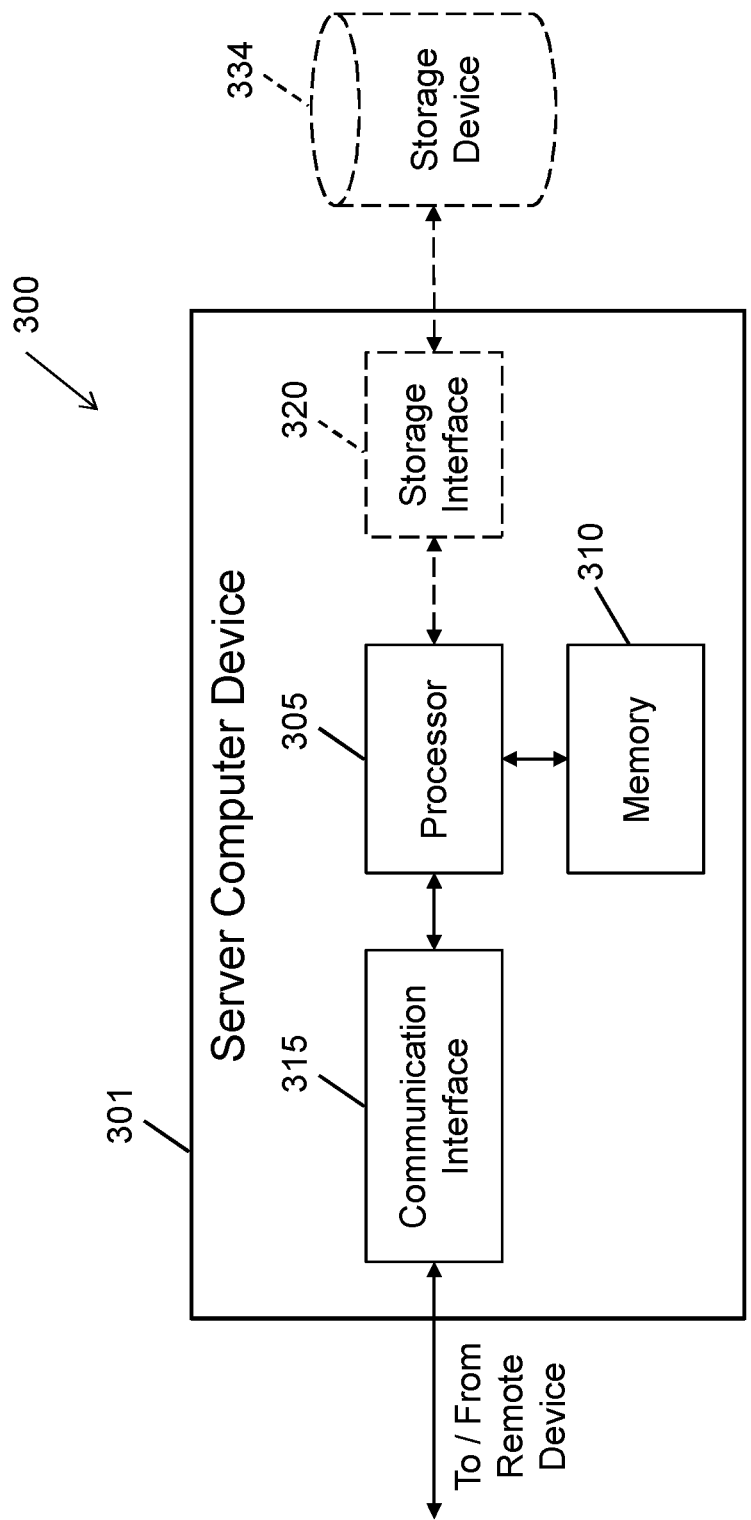
FIG. 3 illustrates an exemplary configuration of a server shown in FIG. 1, in accordance with one embodiment of the present disclosure.

FIG. 3 depicts an exemplary database system 300 such as first database 116, second database 120, and/or third database 128, as shown in FIG. 1, and in accordance with one exemplary embodiment of the present disclosure. Accordingly, database system 300 may include a server computer device 301, which may, in turn, include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client computer device 202 via the Internet and/or over a computer network.

Processor 305 may also be operatively coupled to a storage device 334. Storage device 334 may be any computer-operated hardware suitable for storing and/or retrieving data, such as, but not limited to, data associated with first database 116, second database 120, or third database 128 (all shown in FIG. 1). In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Exemplary Process for Data Security

Figure 4:
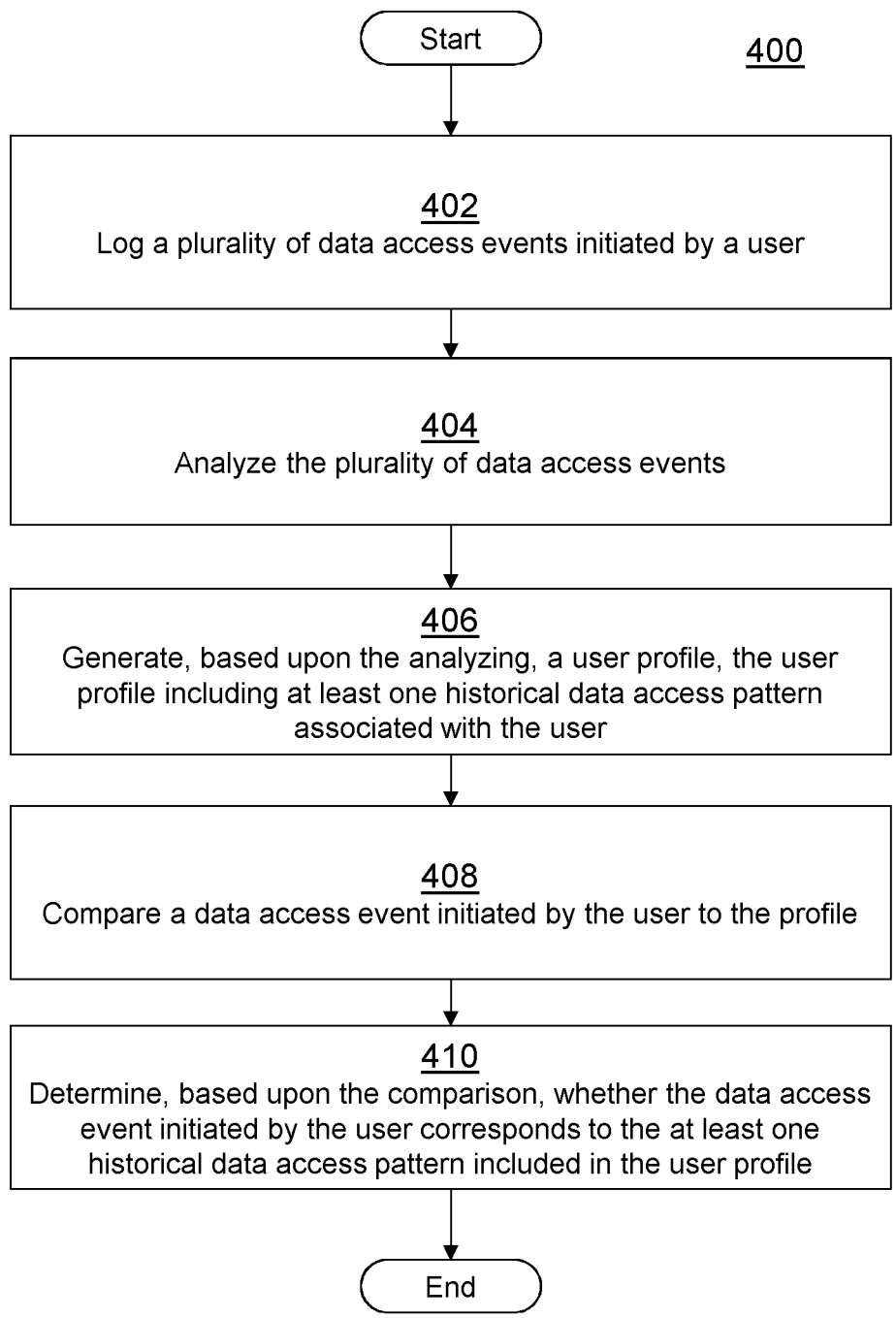
FIG. 4 illustrates a flow chart of an exemplary computer-implemented process for data security, such as of the system shown in FIG. 1.

FIG. 4 depicts a flow chart of an exemplary computer-implemented process 400 for data security, such as for monitoring and responding to data access events. Accordingly, as shown, system 100 may generate one or more user profiles and analyze, in conjunction with the one or more user profiles, a plurality of access events. The plurality of access events may be analyzed by system 100 to determine, for example, whether a user initiating the data access event should be granted access to data requested in conjunction with the data access event, whether one or more notifications, alarms, error codes, and/or messages should be generated in response to the data access event, and the like. In this sense, system 100 may be regarded as an autonomic, behavior based, system for data access security.

To accomplish these, and other, tasks, system 100 may log a plurality of data access events initiated by a user (step 402). More particularly, as described above and in an exemplary embodiment, complex event processing system 118 may receive one or more data access events associated with a plurality of users and may, based upon a received plurality of data access events, generate a plurality of user profiles associated with each of the plurality of users. More particularly, complex event processing system 118 may receive and analyze a plurality of data access events associated with a plurality of users (step 404).

Based upon the analysis, complex event processing system 118 may, in one embodiment, generate a user profile for each user (step 406). Each user profile may be constructed over a period of time and may be based upon a user's historical record of data access events. Thus, a user profile may identify data access events frequently initiated by a user, data access events infrequently initiated by a user, data access events that are never initiated by a user, and the like.

Further, as described above, a score (e.g., a score ranging from one to ten) may be associated with one or more data access events, where a score of one may indicate that the user has only infrequently (or never) initiated particular data access event, while a score often may indicate that the user commonly initiates the particular data access event. Scores between the high and low values of one and ten may be used, in similar fashion, to indicate a frequency with which the user initiates a particular data access event. In some embodiments, each score represents the deviation from the mean for that particular data access event. In some embodiments, the mean is determined based on the historical actions of the individual user. In other embodiments, the mean is determined based on the historical actions of a plurality of users.

Complex event processing system 118 may, in addition, receive permissions and/or access rights data associated with a plurality of users. This data may be maintained, as described above, by assets system 104 and may be transmitted via system 100, to complex event processing system 118, which may include the permissions and/or access rights data with one or more user profiles as appropriate. Thus, a user profile may also indicate, for example, data access event permissions associated with a plurality of users.

In addition, and as described above, real time event processing system 112 may analyze one or more data access events received, for example, from message broker system 108 to determine whether a particular data access event corresponds to at least one historical data access pattern included in a user profile. More particularly, and in at least one exemplary embodiment, real time event processing system 112 may compare one or more data access events initiated by a user to a user profile associated with the user (step 408) to determine whether the one or more data access events initiated by the user conform to, or are otherwise in compliance with, one or more data access events historically initiated by or associated with the user (step 410).

Like complex event processing system 118, real time event processing system 112 may also score one or more data access events initiated by a user based upon the user profile associated with the user. For example, real time event processing system 112 may assign a score, such as a score ranging from one to ten, to a particular data access event initiated by the user. A score of one may indicate, for the example, that the user has only infrequently (or never) initiated particular data access event, while a score of ten may indicate that the user commonly initiates the particular data access event. Scores between the high and low values of one and ten may be used, in similar fashion, to indicate a frequency with which the user initiates a particular data access event.

Real time event processing system 112 may, in addition, perform a variety of actions based upon its analysis of one or more data access events initiated by a user. For example, real time event processing system 112 may generate various notifications, alerts, error codes, warnings, and the like. Real time event processing system 112 may also permit, deny, or restrict a particular data access event.

For instance, where a user initiates a data access event that is beyond the scope (e.g., different from a historical pattern of data access events initiated by the user) of data access events associated with a user profile of the user, real time event processing system 112 may deny the data access event and/or restrict or mask data returned to the user in response to the data access event. For example, real time event processing system 112 may return a subset of the data requested by a user as part of a data access event. Thus, the data requested by a user in conjunction with a data access event may be masked or restricted, such that only a subset of the requested data is provided to the user. On the other hand, where a user initiates a data access event that is within the scope of data access events associated with a user profile associated with the user, real time event processing system 112 may grant access to data returned in response to the data access event.

Thus, in general terms, real time event processing system 112 may compare a data access event, such as a request for data, initiated by a user to a user profile associated with the user (e.g., one or more historical data access events associated with the user) to determine whether the user should be granted access to the data requested in conjunction with the data access event. Further, in some embodiments, the operations described with respect to complex event processing system 118 and real time event processing system 112 may be consolidated and performed by a single processing system.

In addition, and in an exemplary embodiment, client computer device 124 may receive, collect, store, and/or analyze data from other components of system 100 (e.g., SIEM system 110 and/or data access dashboard system 122). For example, client computer device 124 may receive one or more data access events initiated by one or more users and one or more user profiles associated with one or more users and may, in turn, analyze the one or more data access events in conjunction with one or more user profiles to generate a report for display on client computer device 124 that provides information based upon the analysis, such as, for example, a report showing which users have attempted data access events that are beyond the scope of the user profiles.

Client computer device 124 may, more particularly, display a report that includes a plurality of tabs. For instance, in one embodiment, the report displayed by client computer device 124 may include a "bird's eye view" tab, an "entitlements" tab, and/or a "profile" tab. The report displayed by client computer device 124 may be useful for and generated for access by a system administrator.

In one exemplary embodiment, the bird's eye view tab may include information, such as, for example, a high level summary of data access patterns associated with one or more users based upon one or more data classifications, one or more internal and/or external IP addresses, and/or one or more resources allocated to and/or utilized by one or more users or user groups. The bird's eye view tab may include various filtering and/or searching functions, such as, for example, functions which may be performed based upon any of the data received, collected, stored, and/or analyzed as described herein.

In addition, and in one exemplary embodiment, the entitlements tab may illustrate one or more resources, such as one or more computing systems, associated with a particular system administrator, such as a system administrator viewing the entitlements tab via client computer device 124. The entitlements tab may also illustrate one or more users and/or system applications (e.g., software applications executed by system 100) that have accessed one or more resources associated with the system administrator, including, for example, a number of times that the one or more resources were accessed, a timestamp associated with one or more access attempts, and the like. The system administrator may, in addition, utilize the entitlements table to grant, curtail, expand, and/or revoke access to one or more resources for one or more users. The system administrator may also trigger an audit of one or more users based on review. In some further embodiments, the system 100 automatically triggers an audit of a user and informs the system administrator. In still further embodiments, the system 100 revokes one or more permissions of a user in response to the triggering of an audit.

Further, in one exemplary embodiment, the profile table may illustrate historical data access event patterns associated with one or more users. Historical data access patterns may be included, as described above, in a user profile associated with each user, and a system administrator viewing the profile tab may be allowed to view a variety of profile and activity data, such as, for example, a maximum number of data records, or rows, acted upon or with respect to which a data access event has been initiated.

In addition, applications system 132 may be communicatively coupled to, or may include, a user client computing device (such as a client computer device 202), from which a user may interact with system 100, and from which a user may initiate one or more data access events. Thus, as a user interfaces with system 100, data access controller 126 may control access by the user to data contained within system 100, as described above, based upon a user profile associated with the user, the particular data access event initiated by the user, the user's network and file access permissions, and the like.

Exemplary Embodiments & Functionality

In one aspect, a system for data security is provided. In some exemplary embodiments, the system includes a processor and a non-transitory, tangible, computer-readable storage medium having instructions stored thereon that, in response to execution by the processor, cause the processor to perform operations including: (i) logging a plurality of data access events initiated by a user; (ii) analyzing the plurality of data access events; (iii) generating, based upon the analyzing, a user profile, the user profile including at least one historical data access pattern associated with the user; (iv) comparing a data access event initiated by the user to the user profile; and (v) determining, based upon to the comparing, whether the data access event initiated by the user corresponds to the at least one historical data access pattern included in the user profile. For example, the processor may log a plurality of requests submitted by a particular user for access to particular data, and, based upon the plurality of requests, the processor may construct a user profile that reflects the user's requests for data over a historical period of time. This user profile may thus represent or identify data that the user typically, normally, and/or historically requests.

In another aspect, the processor may be further configured to perform operations including performing, in response to the determining, at least one action, wherein the at least one action includes at least one of: generating a notification, generating an alert, permitting the data access event initiated by the user, denying the data access event initiated by the user, and restricting data returned to the user in response to the data access event. The processor may be further configured to perform operations including storing the plurality of data access events initiated by the user in a first database. In addition, in some embodiments, the processor may be further configured to perform operations including storing the user profile in a second database.

In another aspect, the processor may be further configured to perform operations including: (i) logging a plurality of data access events initiated by a plurality of users; (ii) analyzing the plurality of data access events in association with each of the plurality of users; (iii) generating, based upon the analyzing, a plurality of user profiles, each user profile of the plurality of user profiles including at least one historical data access pattern; (iv) comparing a plurality of data access events initiated by the plurality of users to the plurality of user profiles; and (v) determining, based upon to the comparing, whether each of the plurality of data access events initiated by each of the plurality of users corresponds to a particular historical data access pattern included in a user profile of the plurality of user profiles.

In another aspect, the processor may be further configured to perform operations including performing, in response to the determining, at least one action, wherein the at least one action includes at least one of: generating a notification, generating an alert, permitting the data access event initiated by the user, denying the data access event initiated by the user, and restricting data returned to the user in response to the data access event. In addition, the processor may be further configured to perform operations including generating, based upon the comparing, at least one report, the at least one report including at least one of: the at least one data access pattern associated with the user, at least one data access right associated with the user, and a number of data records affected by the data access event initiated by the user. The system may have additional, less, or alternate functionality, including that discussed elsewhere herein.

In another aspect, at least one non-transitory computer readable storage media having computer-executable instructions embodied thereon, wherein when executed by at least one processor, the computer-executable instructions cause the processor to: (i) log a plurality of data access events initiated by a user; (ii) analyze the plurality of data access events; (iii) generate, based upon the analyzing, a user profile, the user profile including at least one historical data access pattern associated with the user; (iv) compare a data access event initiated by the user to the user profile; and (v) determine, based upon to the comparing, whether the data access event initiated by the user corresponds to the at least one historical data access pattern included in the user profile.

In another aspect, the computer-executable instructions may further cause the processor to at least one of: generate a notification, generate an alert, permit the data access event initiated by the user, deny the data access event initiated by the user, and restrict data returned to the user in response to the data access event. The computer-executable instructions may further cause the processor to store the plurality of data access events initiated by the user in a first database and/or store the user profile in a second database.

In another aspect, the computer-executable instructions may further cause the processor to: (i) log a plurality of data access events initiated by a plurality of users; (ii) analyze the plurality of data access events in association with each of the plurality of users; (iii) generate, based upon the analyzing, a plurality of user profiles, each user profile of the plurality of user profiles including at least one historical data access pattern; (iv) compare a plurality of data access events initiated by the plurality of users to the plurality of user profiles; and (v) determine, based upon to the comparing, whether each of the plurality of data access events initiated by each of the plurality of users corresponds to a particular historical data access pattern included in a user profile of the plurality of user profiles.

In another aspect, the computer-executable instructions may further cause the processor to at least one of: generate a notification, generate an alert, permit the data access event initiated by the user, deny the data access event initiated by the user, and restrict data returned to the user in response to the data access event. In addition, the computer-executable instructions may further cause the processor to generate, based upon the comparing, at least one report, the at least one report including at least one of: the at least one data access pattern associated with the user, at least one data access right associated with the user, and a number of data records affected by the data access event initiated by the user. The article may have additional, less, or alternate functionality, including that discussed elsewhere herein.

In yet another aspect, a method for data security is provided. The method includes (i) logging, by a processor, a plurality of data access events initiated by a user; (ii) analyzing, by the processor, the plurality of data access events; (iii) generating, by the processor and based upon the analyzing, a user profile, the user profile including at least one historical data access pattern associated with the user; (iv) comparing, by the processor, a data access event initiated by the user to the user profile; and (v) determining, by the processor and based upon to the comparing, whether the data access event initiated by the user corresponds to the at least one historical data access pattern included in the user profile.

In another aspect, the method also includes performing, by the processor and in response to the determining, at least one action, wherein the at least one action includes at least one of: generating, by the processor, a notification, generating an alert, permitting, by the processor, the data access event initiated by the user, denying, by the processor, the data access event initiated by the user, and restricting, by the processor, data returned to the user in response to the data access event. The method may also include storing, by the processor, the plurality of data access events initiated by the user in a first database and/or storing, by the processor, the user profile in a second database.

In another aspect, the method may include: (i) logging, by the processor, a plurality of data access events initiated by a plurality of users; (ii) analyzing, by the processor, the plurality of data access events in association with each of the plurality of users; (iii) generating, by the processor and based upon the analyzing, a plurality of user profiles, each user profile of the plurality of user profiles including at least one historical data access pattern; (iv) comparing, by the processor, a plurality of data access events initiated by the plurality of users to the plurality of user profiles; and (v) determining, by the processor and based upon to the comparing, whether each of the plurality of data access events initiated by each of the plurality of users corresponds to a particular historical data access pattern included in a user profile of the plurality of user profiles.

Further still, in another aspect, the method may include generating, by the processor and based upon the comparing, at least one report, the at least one report including at least one of: the at least one data access pattern associated with the user, at least one data access right associated with the user, and a number of data records affected by the data access event initiated by the user. The method may have additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system for data security, the system comprising:
a processor; and
a non-transitory, tangible, computer-readable storage medium having instructions stored thereon that, in response to execution by the processor, cause the processor to perform operations comprising:
logging a plurality of data access events initiated by a user, wherein each data access event of the plurality of data access events relates to a request by the user for data stored in a memory;
generating, based upon the plurality of data access events, a user profile of the user, the user profile including a size and a type of data accessed by each of the plurality of data access events;
receiving a new data access event initiated by the user including a size and a type of data requested by the new data access event;
comparing the size and the type of the requested data of the new data access event to the user profile;
determining, based upon the comparing, that the new data access event initiated by the user does not correspond to the data included in the user profile;
restricting the requested data associated with the new data access event; and
transmitting the restricted data to the user.

2. The system of claim 1, wherein the processor is further configured to perform operations comprising performing, in response to the determining step, at least one action, wherein the at least one action includes at least one of: generating a notification and generating an alert.

3. The system of claim 1, wherein the processor is further configured to perform operations comprising storing the plurality of data access events initiated by the user in a first database.

4. The system of claim 1, wherein the processor is further configured to perform operations comprising storing the user profile in a second database.

5. The system of claim 1, wherein the processor is further configured to perform operations comprising:
logging a plurality of data access events initiated by a plurality of users;
analyzing the plurality of data access events in association with each of the plurality of users;
generating, based upon the analyzing, a plurality of user profiles, each user profile of the plurality of user profiles including (i) at least a size of the data accessed by the plurality of data access events and (ii) a type of data accessed by the plurality of data access events;
comparing a plurality of data access events initiated by the plurality of users to the plurality of user profiles; and
determining, based upon to the comparing, whether each of the plurality of data access events initiated by each of the plurality of users corresponds to the data included in the plurality of user profiles.

6. The system of claim 5, wherein the processor is further configured to perform operations comprising performing, in response to the determining step, at least one action, wherein the at least one action includes at least one of: generating a notification and generating an alert.

7. The system of claim 1, wherein the processor is further configured to perform operations comprising generating, based upon the comparing, at least one report, the at least one report including at least one of: the at least one data access pattern associated with the user, at least one data access right associated with the user, and a number of data records affected by the new data access event initiated by the user.

8. At least one non-transitory computer-readable storage media having computer-executable instructions embodied thereon, wherein when executed by at least one processor, the computer-executable instructions cause the processor to:
log a plurality of data access events initiated by a user, wherein each data access event of the plurality of data access events relates to a request by the user for data stored in a memory;
generate, based upon the plurality of data access events, a user profile of the user, the user profile including a size and a type of data accessed by each of the plurality of data access events;
receive a new data access event initiated by the user including a size and a type of data requested by the new data access event;
compare the size and the type of the requested data of the new data access event to the user profile;
determine, based upon the comparing, that the new data access event initiated by the user does not correspond to the data included in the user profile;
restrict the requested data associated with the new data access event; and
transmit the restricted data to the user.

9. The computer-readable storage media of claim 8, wherein the computer-executable instructions further cause the processor to at least one of: generate a notification and generate an alert.

10. The computer-readable storage media of claim 8, wherein the computer-executable instructions further cause the processor to store the plurality of data access events initiated by the user in a first database.

11. The computer-readable storage media of claim 8, wherein the computer-executable instructions further cause the processor to store the user profile in a second database.

12. The computer-readable storage media of claim 8, wherein the computer-executable instructions further cause the processor to:
- log a plurality of data access events initiated by a plurality of users;
- analyze the plurality of data access events in association with each of the plurality of users;
- generate, based upon the analyzing, a plurality of user profiles, each user profile of the plurality of user profiles including (i) at least a size of the data accessed by the plurality of data access events and (ii) a type of data accessed by the plurality of data access events;
- compare a plurality of data access events initiated by the plurality of users to the plurality of user profiles; and
- determine, based upon to the comparing, whether each of the plurality of data access events initiated by each of the plurality of users corresponds to the data included in the plurality of user profiles.

13. The computer-readable storage media of claim 12, wherein the computer-executable instructions further cause the processor to at least one of: generate a notification and generate an alert.

14. The computer-readable storage media of claim 8, wherein the computer-executable instructions further cause the processor to generate at least one report, the at least one report including at least one of: the at least one data access pattern associated with the user, at least one data access right associated with the user, and a number of data records affected by the new data access event initiated by the user.

15. A computer-implemented method for data security comprising:
- logging, by a processor, a plurality of data access events initiated by a user, wherein each data access event of the plurality of data access events relates to a request by the user for data stored in a memory;
- generating, by the processor, based upon the plurality of data access events, a user profile of the user, the user profile including a size and a type of data accessed by each of the plurality of data access events;
- receiving, by the processor, a new data access event initiated by the user including a size and a type of data requested by the new data access event;
- comparing, by the processor, the size and the type of the requested data of the new data access event to the user profile;
- determining, by the processor, based upon the comparing, that the new data access event initiated by the user does not correspond to the data included in the user profile;
- restricting, by the processor, the requested data associated with the new data access event; and
- transmitting, by the processor, the restricted data to the user.

16. The computer-implemented method of claim 15, further comprising performing, by the processor and in response to the determining step, at least one action, wherein the at least one action includes at least one of: generating a notification and generating an alert.

17. The computer-implemented method of claim 15, further comprising storing, by the processor, the plurality of data access events initiated by the user in a first database.

18. The computer-implemented method of claim 15, further comprising storing, by the processor, the user profile in a second database.

19. The computer-implemented method of claim 15, further comprising:
- logging, by the processor, a plurality of data access events initiated by a plurality of users;
- analyzing, by the processor, the plurality of data access events in association with each of the plurality of users;
- generating, by the processor and based upon the analyzing, a user profile of a user, the user profile including (i) at least a size of the data accessed by the plurality of data access events and (ii) a type of data accessed by the plurality of data access events;
- comparing, by the processor, a plurality of data access events initiated by the plurality of users to the plurality of user profiles; and
- determining, by the processor and based upon to the comparing, whether each of the plurality of data access events initiated by each of the plurality of users corresponds to the data included in the plurality of user profiles.

20. The computer-implemented method of claim 15, further comprising generating, by the processor and based upon the comparing, at least one report, the at least one report including at least one of: the at least one data access pattern associated with the user, at least one data access right associated with the user, and a number of data records affected by the new data access event initiated by the user.

* * * * *